US010065683B2

(12) United States Patent
Steffens et al.

(10) Patent No.: US 10,065,683 B2
(45) Date of Patent: Sep. 4, 2018

(54) B-PILLAR FOR A MOTOR VEHICLE BODY AND PROCESS OF PRODUCING A B-PILLAR

(71) Applicant: Muhr und Bender KG, Attendorn (DE)

(72) Inventors: Hubertus Steffens, Drolshagen (DE); Bernhard Spielvogel, Moosbach (AT)

(73) Assignee: Muhr und Bender KG, Attendorn (DE)

( * ) Notice: Subject to any disclaimer, the term of this patent is extended or adjusted under 35 U.S.C. 154(b) by 30 days.

(21) Appl. No.: 15/260,338

(22) Filed: Sep. 9, 2016

(65) Prior Publication Data

US 2017/0073017 A1    Mar. 16, 2017

(30) Foreign Application Priority Data

Sep. 14, 2015   (DE) .................. 10 2015 115 439

(51) Int. Cl.
*B62D 25/04* (2006.01)
*B62D 29/00* (2006.01)
*B62D 29/04* (2006.01)

(52) U.S. Cl.
CPC ............. *B62D 25/04* (2013.01); *B62D 29/00* (2013.01); *B62D 29/005* (2013.01); *B62D 29/043* (2013.01)

(58) Field of Classification Search
CPC ...... B62D 25/02; B62D 25/04; B62D 27/023; B62D 29/005; B62D 29/043
USPC ............. 296/187.03, 187.12, 193.06, 203.03
See application file for complete search history.

(56) References Cited

U.S. PATENT DOCUMENTS 9,315,215 B2 *   4/2016   Heo ................. B62D 25/04

FOREIGN PATENT DOCUMENTS

| DE | 102007053353 A1 | 5/2009 | |
|---|---|---|---|
| DE | 102011111232 A1 | 2/2013 | |
| DE | 102012203888 A1 | 9/2013 | |
| DE | 102013017269 A1 | 8/2014 | |
| DE | 102014116118 A1 | 6/2015 | |
| EP | 1867559 A2 | 12/2007 | |
| EP | 1912849 A1 | 4/2008 | |
| FR | 2959981 A1 * | 11/2011 | ............. B62D 25/04 |
| WO | 2008024042 A1 | 2/2008 | |
| WO | 2011113503 A1 | 9/2011 | |

OTHER PUBLICATIONS

English translation of FR 2959981; retreived Jan. 11, 2017 via PatentTranslate located at www.epo.org. (Year: 2018).*

* cited by examiner

*Primary Examiner* — Jason S Daniels
(74) *Attorney, Agent, or Firm* — Bejin Bieneman PLC

(57) ABSTRACT

A B-pillar for a motor vehicle body has an inner panel made of sheet metal material and a multi-component outer panel connected to the inner panel. The outer panel comprises a lower formed part made of sheet metal material and an upper formed part made of fiber reinforced plastic, which two formed parts are arranged along a region of overlap so as to overlap one another and are connected to one another such that the lower formed part projects from the upper formed part beyond the upper formed part beyond the region of overlap in a first direction of longitudinal extension of the B-pillar and that the upper formed part projects from the lower formed part beyond the region of overlap in a second direction of longitudinal extension of the B-pillar.

14 Claims, 4 Drawing Sheets

B-PILLAR FOR A MOTOR VEHICLE BODY AND PROCESS OF PRODUCING A B-PILLAR

CROSS-REFERENCE TO RELATED APPLICATION

This application claims priority to German Application No. DE 10 2015 115 439.0 filed on Sep. 14, 2015, which application is hereby incorporated herein by reference in its entirety.

BACKGROUND

Within the motor vehicle body, the B-pillar, which can also be referred to as central pillar or column, represents one of the most sophisticated parts because of the factors of its weight, stiffness and resonant frequency. The B-pillar is usually produced from two or more panel components and comprises at least one inner panel which, in the built-in condition in the motor vehicle body, faces a vehicle interior, as well as an outer panel which, accordingly, faces away from the vehicle interior. The outer panel, which can also be referred to as the outer shell, outer part, the outside of the B-pillar, or outer B-pillar, can be provided in the form of a U-shaped steel element which is closed from the vehicle interior by the inner panel. The inner panel can also be referred to as the cover, closing plate, inner plate or inside B-pillar. For the purpose of connecting the panels to one another, they can comprise lateral joining and connecting flanges which can be connected to one another by spot welding. The B-pillar integrated into the motor vehicle body can then, by further joining processes, be connected to the outer skin of the motor vehicle body, to the roof, or to glass surfaces.

From DE 10 2014 116 118 A1 there is known an outer part of a B-pillar which comprises an outer side panel, an upper panel, a lower panel and an inner side panel. The inner side panel, the upper panel and the outer side panel of the outer part of the B-pillar are joined together along lateral connecting flanges. The upper panel is connected to the lower panel along a region of overlap.

Due to the lateral joining and connecting flanges, the amount of material of the outer panel and inner panel is double-layered in these connecting regions. By connecting the two panels by spot welding which—along the joining and connecting flanges—normally only takes place every 30 to 50 mm—the outer panel and the inner panel are only partially connected to one another. In addition, because during spot welding heat is introduced into the material of the panels point-wise, there occur partial soft zones in the flanges which, if crash energy is introduced, are inclined to initiate a crack which, finally, can lead to crack failure in the B-pillar.

Furthermore, it is common practice to produce especially the outer panel from a Tailor Rolled Blank or a Tailor Welded Blank for the purpose of varying the plate thickness in the longitudinal direction of the outer panel. As a result, it is possible to provide reinforced regions, weaker regions and softer regions for specifically influencing the crash behaviour of the vehicle pillar in order to adapt the B-pillar to application-specific or market-specific requirements. However, at least in the region of spot-welded joined and connected flanges, said thickness variation has to be transferred to the inner panel. This also means that it is necessary to provide inner panels which correspond to the different outer panels. This leads to high costs and complicated logistics.

For reducing the weight of the B-pillar, it is known to produce the panels with thinner walls or out of light metal, and to increase their stiffness consistently or locally with fibre-reinforced plastic.

EP 1 867 559 A2 proposes a B-pillar which comprises a multi-panel structure with an outer panel and an inner panel welded thereto. For reinforcing the B-pillar it comprises an impact-resistant reinforcement part made of fibre-reinforced plastic which is glued to an inside of the inner plate.

From DE 2013017 269 A1 there is known a further B-pillar in a multi-panel design, wherein, for weight reducing purposes, there is produced an inner panel and an outer panel being connected to the inner panel; both panels are made of aluminium plates. To reinforce the B-pillar, reinforcing elements are arranged between the inner panel and the outer panel. A first one of the reinforcing elements is a plate metal part made of an aluminium alloy. A second one of the reinforcing elements is produced from fibre-reinforced plastics which is received between the first reinforcing element and the inner panel.

Further hybrid body components are known from DE 10 2012 203 888 A1 and DE 10 2011 111 232 A1. In order to reinforce heavily stressed body parts, it is known to reinforce plate metal components in the heavily stressed regions additionally with fibre-reinforced plastic components.

Due to the use of multi-panel designs comprising further reinforcing panels in addition to the outer panel and inner panel and due to the locally applied fibre-reinforced plastic reinforcing elements, such B-pillars are very expensive to produce. Furthermore, additional reinforcements are against the principle of lightweight construction.

SUMMARY

The present disclosure relates to a B-pillar for a motor vehicle body having an inner panel of sheet metal material, and an outer panel which is connected to the inner panel. Furthermore, the disclosure relates to a process of producing such a B-pillar for a motor vehicle body.

The disclosed B-pillar has a reduced number of components and a reduced weight, further comprising a high degree of stiffness and crash behaviour. Furthermore, by a process it is possible to produce a B-pillar with fewer components, a reduced weight and a high degree of stiffness fulfilling the stringent demands in cases of crash.

A B-pillar has an outer panel that is of the multi-component type and that comprises a lower formed part made of sheet metal material and an upper formed part made of fibre-reinforced plastic, wherein the two formed parts are arranged along a region of overlap only and overlap one another and are connected to one another such that the lower formed part projects from the upper formed part beyond the region of overlap in a first direction of longitudinal extension of the B-pillar and the upper formed part projects from the lower formed part beyond the region of overlap in a second direction of longitudinal extension of the B-pillar.

The outer panel of the B-pillar is a multi-component hybrid part, which means that the lower formed part made of sheet metal material and the upper formed part made of fibre-reinforced plastic, together, functionally form the outer panel of the B-pillar. The two formed parts are arranged so as to be offset relative to one another and overlap along a defined longitudinal portion of the B-pillar, which portion is referred to as the region of overlap. The region of overlap serves to connect the two formed parts to one another which, therefore, are connected to one another only in the region of overlap. Accordingly, above the region of overlap, the outer panel is formed by the upper formed part only. As a result, the upper region of the hybrid outer panel is determined entirely by the properties of the upper formed part made of fibre-reinforced plastic. Analogously, the same applies to the lower region of the outer panel, which is formed entirely by the lower formed part made of sheet metal material. As a result, a light-weight outer panel and together with the inner panel made of sheet metal material a lightweight hybrid B-pillar is provided having a reduced number of components.

The region of overlap of the outer panel is positioned in a central region of the B-pillar which is designed with a high strength value to protect the car passengers in the case of a crash. To that extent, it is advantageous that as a result of having doubled the amount of material of the lower formed part made of sheet metal material and of the upper formed part made of fibre reinforced plastic, the B-pillar has been reinforced in the region of overlap. In said longitudinal region being reinforced by the two formed parts overlapping each other, i.e., in the region of overlap, mounting elements or functional parts such as receiving elements or a connecting plate for a locking wedge for the front door, a door lock, a door hinge or a rear door latch are commonly provided in the built-in condition of the B-pillar at the vehicle body. Furthermore, the B-pillar comprises a lower longitudinal region which can also be referred to as the foot region, as well as an upper longitudinal region which is also referred to as the head region. The terms "downwards" and "upwards" or "centre" give spatial information with reference to the B-pillar in the built-in condition at the vehicle body.

The lower formed part extending in the first direction of longitudinal extension of the B-pillar, i.e., downwards into the foot region of B-pillar, is usually connected to a sill-board of the vehicle body. In contrast, the upper formed part extending into the second longitudinal direction of the B-pillar, i.e., upwards into the head region of the B-pillar, can be connected to a roof or roof bow. Both the first and the second direction of longitudinal extension are to be interpreted as being vectors which point particularly in two opposed directions of the B-pillar. In contrast to the region of overlap being stiffened by providing double layer of material, the upper region of the B-pillar with the upper formed part and/or the lower region of the B-pillar with the lower formed part, as compared to the region of overlap, comprise a high crash absorption capability.

In one example, a longitudinal extension of the region of overlap is smaller than 70% of a longitudinal extension of the lower formed part and/or smaller than 50% of a longitudinal extension of the upper formed part. As a result, the weight of the B-pillar can be reduced. Thus, the region of overlap is limited to a maximum size and area required to connect the two formed parts and to attach the above-mentioned mounting or functional components. "Longitudinal extension" means the maximum extension of the region of overlap and, respectively, of the respective formed parts of the first and/or second direction of longitudinal extension of the elongated B-pillar.

Furthermore, the lower formed part, starting from the foot end of the B-pillar can extend in the second direction of longitudinal extension, i.e., upwards towards the head end of the B-pillar, but not beyond the region of overlap, over a maximum of 70% of the maximum longitudinal extension of the B-pillar. Alternatively or in addition, the lower formed part can extend over a minimum of 40%, more particularly 50%, of the maximum longitudinal extension of the B-pillar. The upper formed part, starting from the head end of the B-pillar can extend in the first direction of longitudinal extension, i.e., downwards towards the foot end of the B-pillar, but not beyond the region of overlap, over a maximum of 80% of the maximum longitudinal extension of the B-pillar. Alternatively or in addition, the upper formed part can extend over a minimum of 50%, more particularly 60%, of the maximum longitudinal extension of the B-pillar.

In the region of overlap, the lower formed part and the upper formed part can be connected to one other in at least one of the material locking, force locking, and form locking ways, possibly by at least two of said types of connection. Material locking, force locking and form locking achieve a particularly stable connection between the two formed parts.

Material locking includes all material locking connections in the case of which the connected partners, in this case the lower formed part and the upper formed part, are held together by atomic or molecular forces. In addition, the material locking connections are non-releasable connections which can only be separated by destroying the joint. Material locking can be produced for example by soldering, welding, gluing or vulcanising. In an example, the upper formed part and the lower formed part are glued to one another in the region of overlap.

Force locking means securing the connection of two partners to be connected by an outer force, for instance hot riveting a friction force, hold the two partners to be connected in their mutual position relative to one another. Force locking, for example, can be achieved by a screwed, riveted, nailed or clamped connection.

Furthermore, in the region of overlap, the upper formed part is placed from the outside onto the lower formed part, more particularly flush against the lower formed part. That means the upper formed part can embrace the lower formed part from the outside. In this way, it is possible to achieve a stable connection between the two formed parts. In the region of overlap, the upper formed part and the lower formed part can be connected to one another in a form locking way. A form locking connection is produced by two partners to be connected, wherein the parts to be connected comprise shapes which correspond to one another. In this way a movement of the two connected parts relative to one another cannot take place. More particularly, forces and torque can be transmitted from one to the other formed part. By means of this form locking connection between the upper formed part and the lower formed part the connection between the two formed parts is additionally reinforced. The decisive factor is that the two formed parts are not connected to one another outside the region of overlap.

It is advisable for the lower formed part and the upper formed part to be connected to one other by fixing elements in a force locking way. More particularly, the fixing elements are designed for attaching mounting elements or functional elements held at the B-pillar. Thus, the large number of B-pillar components can be reduced further. In this way, the fixing elements required to attach the mounting or functional parts for the vehicle, for example the door hinges or rear door catches, can also be used for the force-locking connection between the lower formed part and the upper formed part. Such fixing means can be screws and/or rivets for example.

Furthermore, in the region of overlap, on the outer face of the upper formed part facing away from the inner panel, it is possible to arrange a reinforcing element made of sheet metal material for supporting at least some of the fixing elements. In this way, if crash energy is introduced, for instance in the case of a lateral collision, it is possible to prevent the fixing elements from being pressed through and thereby punching out the upper formed part made of fibre reinforced plastic. The reinforcing element can be a sheet metal piece which can also be referred to as a patch. For this purpose, the reinforcing element can be produced from a sheet metal plate, more particularly a steel plate.

In order to prevent contact corrosion between the basically metallic fixing elements with the upper formed part, which, for example, can be produced from carbon fibre reinforced plastics (CFK), it is possible, to provide a sleeve, more particularly sleeves for all the fixing elements which pass through the upper formed part. Alternatively or in addition to at least one sleeve, the fixing elements can be made of a corrosion-resistant material, for example titanium.

Furthermore, in order to avoid contact corrosion between the lower formed part made of sheet metal material and the upper formed part in the region of overlap and/or between the upper formed part and the reinforcing element made of sheet metal material, it is possible to provide a blocking layer. For example, the blocking layer can be a varnish or a thin corrosion preventing component which is arranged in the region of overlap between the two formed parts.

In a further example, the inner panel can comprise supporting portions extending at least approximately in the second direction of longitudinal extension and the upper formed part can comprise corresponding connecting portions for connecting the supporting portions. Furthermore, the inner panel and the upper formed part can be form-lockingly and/or material-lockingly connected to one another outside the region of overlap. Thus, sufficiently stable connection between the upper formed part and the inner panel is achieved. Outside the region of overlap, the upper formed part, by means of its connecting portions, is supported on the supporting portions of the inner panel and more particularly on the upper flange portion. To avoid contact corrosion between the inner panel made of sheet metal material and the upper formed part, it is possible to provide a further blocking layer. The supporting portions extend at least approximately in the second direction of longitudinal extension, so that the supporting portions can follow a B-pillar which is frequently for design-technical reasons not completely straight but slightly bent. Thus, the expression "at least approximately in the second direction of longitudinal extension" also is to be understood to mean a curved extension of the supporting portions in addition to a straight line of extension of the supporting portions. In principle, the upper formed part can also be connected to the lower formed part and/or the inner panel after the inner panel and the lower formed part have been fixed to the vehicle body as a virtually half-finished B-pillar. In this way, the upper formed part can be added to the vehicle car case that means during the assembly of the motor vehicle body.

Furthermore, the supporting portions outside the region of overlap can comprise grooves which are engaged by the connecting portion of the upper formed part in a form-locking way. However, a carrying connection between the upper formed part and the inner panel along the grooves is not necessary. In principle, it is sufficient to provide a purely from-locking connection between the upper formed part and the inner panel, so that there is no need for a material-locking connection. In an example, for producing a form-locking connection with the connecting portions, the upper formed part engages the grooves. Depending on the type of application, the upper formed part can be fixed in the grooves of the panel also in material-locking way. For producing the material-locking connection, the regions of overlap of the upper formed part can be glued to the inner panel along the grooves.

Furthermore, the connecting portions of the upper formed part can be provided as bent edge regions of the upper formed part. Said bent edge regions forming the connecting portions of the upper formed part reinforce the edge region of the upper formed part, being stressed by tensile stresses, and reduce the sensitivity to form notches.

Outside the region of overlap, the upper formed part —at least partially—can have a U-shaped cross-section and can be configured such that an outer wall of the upper formed part resiliently suspends up to 10% of a construction-related distance between the outer wall and the inner panel towards the inner panel, when a force acting from outside onto the outer panel, more particularly a crash energy in the case of a crash. In this way, the crash properties of the B-pillar are improved. Above the region of overlap, the B-pillar is thus resilient and comprises a basic shape which is deformable in the elastic region.

Furthermore, the connecting portions of the at least partially U-shaped upper formed part can be formed at edge regions by two side walls of the upper formed part, wherein between the outer wall and the respective side walls, there is enclosed an angle ranging between 100° and 170°, more particularly between 100° and 140°. As a result of the inclined position of the side walls, which are turned outwardly in a virtually V-like way, a particularly stable connection between the upper formed part and the inner panel is provided. Thus, the B-pillar and more particularly the upper formed part can be designed and adjusted to the required strength, for example by changing the angle between the outer wall and the respective adjacent side wall. Furthermore, individual partial regions of the head region of the B-pillar, more particularly of the upper formed part, in addition to changing the angle, can be designed to achieve the specified behaviour adapting the shape and/or by the wall thickness and/or the composition of the fibre-reinforced plastics. For example, transitions, corners or the like can be specifically reinforced by adding further fibre layers.

Furthermore, the crash behaviour of the B-pillar in the head region can be improved in that the upper formed part in intersection areas between the outer wall and the side walls comprises a joint-like material weakening, a notch or buckled area. By deliberately introducing a weakening of the upper formed part in the intersection areas the elasticity of the B-pillar can be adjusted for a force acting from the outside onto the B-pillar. In case of an impact on one side, the outer wall of the upper formed part can thus be pressed towards the inner panel, wherein the side walls being able to yield by straightening up relative to the inner panel.

Furthermore, the inner panel can have a weakened material portion being arranged between the side walls of the upper formed part. Said portion can extend above the region of overlap in the second direction of longitudinal extension of the B-pillar. However, in principle, further portions of the inner panel can also comprise artificially weakened portions. Said weakened portion can have a higher degree of elasticity than the surrounding portions of the inner panel. As a result, in the case of a lateral impact, the side walls of the at least partially U-shaped upper formed part engaging the grooves of the inner panel can straighten up relative to the inner panel, i.e., the distance between the free longitudinal ends of the side walls is reduced. Thereby, the longitudinal ends of the side walls move towards each other and compress the weakened material portion of the inner panel. In this way, compared to an inner panel not containing such a portion whose material is weakened up to a certain degree, the upper formed part can absorb more energy because the inner panel is resilient and does not generate additional stresses in the upper formed part. As the upper formed part made of fibre reinforced plastic comprises a very low fracture ductility and would plastically fail if the fracture force is exceeded, the required fracture force is increased by the artificially weakened inner panel. In this way, it is easier for the upper formed part to be resilient and to be able to absorb more energy without braking when a side impact occurs. If the crash energy stays below the fracture force of the upper formed part, the side walls of the upper formed part can move outwardly again after the stress is relieved, i.e., the distance between the free longitudinal ends of the side walls is again increased. In this way, it is possible for the upper formed part to be resilient again, i.e., to virtually breathe. Then, as a result of the outwardly moving free longitudinal ends engaging the grooves of the inner panel, the inner panel is again pulled apart along the weakened portion and the upper formed part releases the energy absorbed.

In a further example, the lower formed part has at least one welded portion for being connected to the inner panel. The welding process can be carried out by resistance welding or spot welding. According to an alternative possibility, the lower formed part and the inner panel can be connected to one another by a high-energy weld along the connecting edge of the at least one welded portion. Independently of the type of welding process, the connecting edge of the lower formed part is spaced from the outer edge of the inner panel such that the inner panel, between the connecting edge and the outer edge, forms a single-layered flange portion of the B-pillar. Because the connecting edge of the lower formed part is set back relative to the outer edge of the inner panel, the welding device can easily be applied on one side for producing the weld.

In an example, the weld extends along at least 50% of the longitudinal extension of the connecting edge and more particularly along at least 50% of the longitudinal extension of the lower formed part. Thus, there is no need for the lower formed part to be spot-welded to the inner panel, but as an option, it should not be excluded. Overall, the high-energy weld ensures a more stable connection between the lower formed part and the inner panel as the heat introduced is more uniform than in the case of spot welding. Thus, no local soft zones are introduced that, in the case of a crash, can form the start of cracks. In addition, because of the set back of the lower formed part relative to the inner panel, material doubling due to an overlap of the upper formed part over the single-layered flange portion of the inner panel is avoided. Thus, weight is saved directly at the lower formed part and, overall, a more light-weight B-pillar is provided.

Furthermore, the single-layered flange portion of the B-pillar, which can also be referred to as welding flange, is particularly suitable for being welded to further components, for instance an outer skin of the motor vehicle which is joined to the B-pillar in its built-in condition. It is also suitable for attaching glass surfaces. This means that further components such as the outer skin, glass surfaces or the roof need to be connected to the inner panel only. This is particularly advantageous in those cases where the lower formed part of the outer panel has bad welding properties. That can be the case, for example, if the lower formed part is hot-formed and/or hardened. Contrary, the inner panel is usually cold-formed and has good welding characteristics.

Because the lower formed part can be connected to the inner panel by a laterally attached weld, the inner panel and the lower formed parts can have different wall thicknesses. It is thus possible for the crash behaviour of the B-pillar to be influenced specifically by varying the wall thicknesses in partial regions of the outer panel. In an example, the lower formed part is produced from Tailor Rolled Blanks or Tailor Welded Blanks, thus comprising a uniform wall thickness in its maximum transverse extension. The lower formed part can thus specifically be adjusted locally to the respective case of stress application. Any partial regions of the lower formed part or of the B-pillar which are subjected to lower stress can have a smaller wall thickness, as a result of which the material consumption of the lower formed part is reduced, while, overall, the weight of the of the B-pillar is reduced. On the other hand, partial regions subjected to particularly high stress of the lower formed part and of the B-pillar can be made to be more stable. The upper formed part can also have a variable wall thickness and the wall thickness can easily be adapted in an easy way via the layering of the fibre-reinforced plastics. Finally, if there is a case of different wall thickness profiles of various outer panels, it is always possible to provide a standardised inner panel which market-wide has a constant wall thickness. However, it is understood that according to an alternative or additional example, the inner panel, too, can be provided with a variable wall thickness along the longitudinal extension of same. In this way, optionally, it is possible, in addition to the outer panel, that partial regions of the B-pillar can be specifically reinforced.

More particularly, between at least one welded portion of the lower formed part and the single-layered flange portion of the inner panel an angle of 1° to 90° can be enclosed. In other words, the welded portion of the lower formed part can be arranged so as to be inclined or to extend perpendicularly on the inner panel. In this way, the two components, at least in the region of the welded portion, contact one another along the connecting edge only. Thus, it is possible to provide a particularly narrow welded portion, as a result of which there is provided a more light-weight lower formed part and a more light-weight B-pillar. In addition, it is advantageous that, due to the inclined arrangement of the welded portion on the inner panel behind the weld, there is formed an inwardly opening space which can be used for de-gassing a metal vapour escaping during the high-energy welding process.

The inner panel can be a cold-formed component made of a metallic material which is possibly produced out of steel plate. Cold-forming refers to metal forming at a temperature which is clearly below its re-crystallisation temperature. The steel material, for example, can be a cold-rolled, micro-alloy steel plate, for instance HC420LA+. The steel plate can be provided with a zinc coating, for example ZE75/75.

The lower formed part of the hybrid outer panel can be a hot-formed and hardened component made of a metallic material possibly produced from steel plate. Hot-forming means the forming of metal above the re-crystallisation temperature. The lower formed part can additionally be hardened. The steel material can be boron steel, more particularly 22MnB5, with any other hardenable steel material also being conceivable. The lower formed part can be coated, more particularly with an aluminium silicon alloy or zinc in order to prevent component oxidizing at high temperatures during the hot-forming process and to provide corrosion protection for the lower formed part. The lower formed part can be coated before and/or after hot-forming. If coating takes place prior to the hot-forming process, it is possible, on the one hand, to coat the strip material out of which the lower formed part is produced or, on the other hand, to coat the sheet bar itself. If coating takes place after the hot-forming operation, the formed and in some cases the already hardened lower formed part can be coated.

The lower formed part can be hardened either after the hot forming operation or at the same time as the hot forming operation at least in partial regions or possibly in its entirety. The operations of hot-forming and hardening can be carried out in one process in a press hardening tool. Said combined forming and hardening process can also be referred to as press hardening. For example, the lower formed part can be produced out of a blank which, prior to the hot-forming operation, is heated to at least 800 to 850 degrees Celsius; it is then placed into a forming tool and formed in its hot condition and then quickly cooled by establishing contact with the forming tool. The forming tool can be force-cooled from the inside. Cooling the lower formed part in the forming tool can take place for example in approximately 15 seconds or less down to approximately 200 degrees Celsius for example. Apart from the above-described press hardening process, the lower formed part can also be hardened in a different way. According to an example, the hardened lower formed part can also comprise locally soft zones which, in the case of a crash, particularly can serve as designated deformation zones. The mechanical properties of the soft zones can be designed so as to meet the respective requirements. For example, soft zones provided in the form of failure regions, can have a higher fracture ductility value than the fracture ductility value of the hardened base material. In an example, fracture ductility in the soft zones amounts to more than 10%, particularly 10% to 15%. On the other hand, the fracture ductility of the hardened base material of the lower formed part can range between approximately 4% to 7%.

The upper formed part of the hybrid outer panel can be a carbon fibre reinforced plastic (CFK) part. Besides CFK, the upper formed part can also be made out of a fibre composite material with other high-strength fibre materials. The upper formed part can also comprise different wall thicknesses.

A process of producing a B-pillar for a motor vehicle body comprises the following steps: providing an inner panel made of sheet metal material; providing a lower formed part made of sheet metal material; providing an upper formed part made of carbon fibre reinforced plastic; connecting the lower formed part to the inner panel; positioning the upper formed part on the lower formed part such that the two formed parts overlap one another in a region of overlap only, wherein the lower formed part projects from the upper formed part beyond the region of overlap in a first direction of longitudinal extension of the B-pillar and wherein the upper formed part projects from the lower formed part beyond the region of overlap in a second direction of longitudinal extension of the B-pillar; and connecting the upper formed part to the lower formed lower part in the region of overlap.

The process of producing the B-pillar provides the same advantages as described in connection with the B-pillar, so that briefly reference will be made to the above description and it is understood that all the above-mentioned examples of the device can be transferred to the process, and vice versa. Overall, the number of components of the inventive B-pillar has been reduced and the weight of same has been reduced further; it comprises great stiffness and can meet the requirements relating to complicated crash cases.

It is advantageous to weld the lower formed part to the inner panel, particularly using a high energy beam welding process which, if compared to other welding processes introduces less thermal energy in a more concentrated way into the parts to be joined. Compared with resistance spot welding, the degree of thermally related distortion is clearly reduced, wherein resistance welding is also conceivable. Furthermore, high energy beam welding requires access on one side only for the purpose of welding parts together. On the other hand, resistance spot welding requires access to two sides to be able to move the welding electrodes to the inner panel and to the lower formed part. Because the connecting edge of the lower formed part is set back relative to the outer edge of the inner panel, the connecting edge, additionally, can easily be reached, so that the use of high energy beam welding is simplified. As high energy welding, electric arc and electron beam welding processes can be used, and especially the laser beam welding process is particularly suitable, wherein the selected welding process can be carried out with or without any additional material.

To achieve a particularly stable connection between the lower formed part and the inner panel, the high energy beam welding seam can be set along 50% of an edge length of the connecting edge. The weld, which can be adapted to the stress on the inner panel and the lower formed part, is more stable than conventional resistance welded spots. In an example, the high energy beam weld is set continuously along at least 50% of the length of the connecting edge.

According to an example, in terms of time, the lower formed part is placed on the inner panel before the upper formed part and connected to the inner panel. Subsequently, the upper formed part is placed in position, with the upper formed part overlapping the lower formed part in the region of overlap and being located above the upper formed part on the inner panel. Furthermore, in the region of overlap, the upper formed part can be form-lockingly connected to the lower formed part at least in certain portions.

BRIEF SUMMARY OF THE DRAWINGS

Examples will be explained below with reference to the Figures.

DETAILED DESCRIPTION

Figure 1:
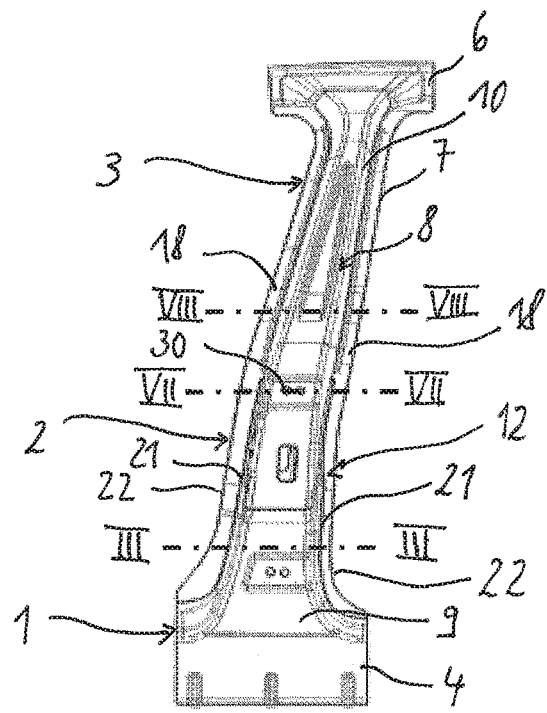
FIG. 1 shows an example B-pillar in a lateral view.

FIG. 1 shows a vehicle pillar of a motor vehicle body in the form of a B-pillar that can be referred to as a central pillar as well. The B-pillar comprises an elongated hollow basic structure which, in the built-in condition of the B-pillar at the body of the motor vehicle, extends from the bottom to the top and which can be divided into a foot region 1, a central region 2 and head region 3.

Starting from the bottom to the top, the B-pillar, in the built-in condition, can be connected by means of its foot region 1 to a bottom of the vehicle body (not shown). For this purpose, the B-pillar can comprise a lower flange portion 4 which can be T-shaped, for example, and fixable to a not shown sill-board of the bottom of the vehicle body.

In the built-in condition of the B-pillar at the vehicle body, functional parts 5, such as receiving elements or attaching elements for a locking wedge for the front door, a door lock, a door hinge or a rear door catch can be attached in the central region 2 of the B-pillar.

Via the head region 3, the B-pillar, in the built-in condition, can be attached to a not shown roof region of the vehicle body. For this purpose, the B-pillar can comprise an upper flange portion 6, which can be T-shaped for example and which serves to attach the B-pillar to the roof region of the vehicle body.

Figure 2:
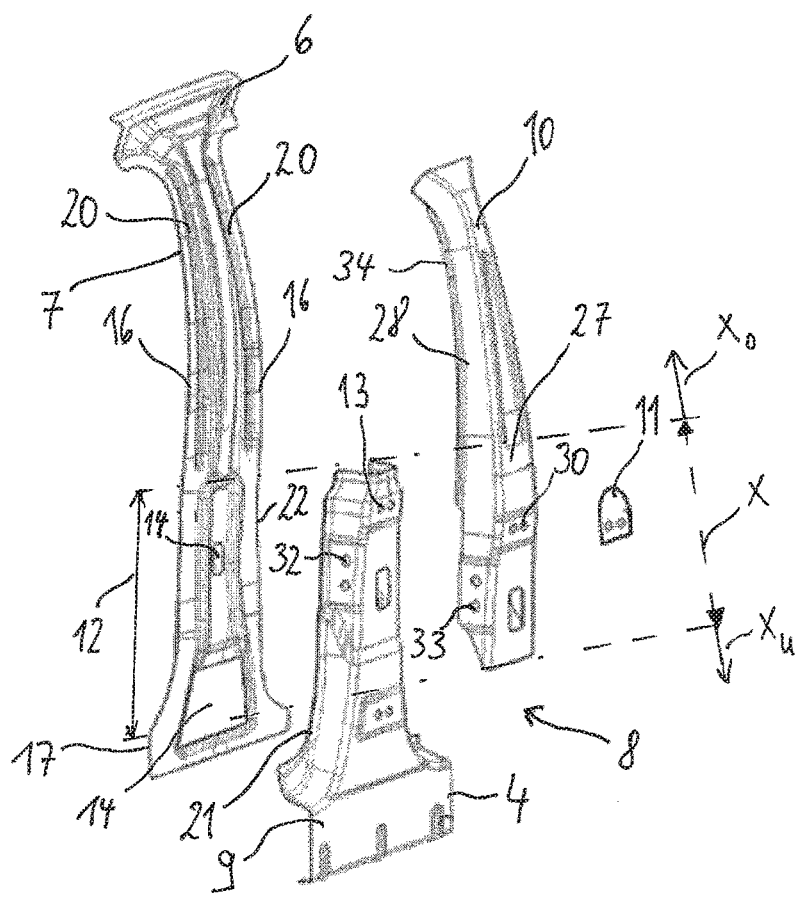
FIG. 2 shows the B-pillar of FIG. 1 in an exploded view.

As can be seen in FIG. 2, the B-pillar comprises an inner panel 7 which, in the built-in condition at the vehicle body, faces a vehicle interior, a multi-component outer panel 8, which faces away from the vehicle interior, having a lower formed part 9, and an upper formed part 10, and a reinforcing element 11.

The inner panel 7 can be a cold-formed component made of sheet steel comprising a constant wall thickness in longitudinal and transverse direction. In principle, depending on requirements to be met by the B-pillar, the inner panel 7 can also have different wall thicknesses in longitudinal and/or transverse directions. The steel material can for instance be a cold-rolled, micro alloy steel plate, for example, HC 420 LA+ which, prior to cold-forming, can be provided with a zinc coating on both sides. Such coated strip material can be used to produce a blank in a well-known way that, subsequently, is cold-formed into an inner panel 7. "Cold forming" means forming of metal at a temperature which is clearly below the re-crystallisation of the sheet steel used in this case, for example at room temperature.

Functionally, the multi-component outer panel is formed by the lower formed part 9 and the upper formed part 10 which are arranged so as to overlap along a region of overlap 12 only, and which are connected to one another. In other words, the lower formed part 9 and the upper formed part 10 are arranged so as to be offset relative to one another, with the two formed parts 9, 10 overlapping one another in the region of overlap 12 and being positioned one above the other. The lower formed part 9 projects from the upper formed part 10 beyond the region of overlap 12 downwards, i.e., in a first direction of longitudinal extension $X_u$ of the B-pillar. Contrarily, the upper formed part 10 projects from the lower formed part 9 beyond the region of overlap 12 upwards in a direction which is opposed to the first longitudinal direction of extension $X_u$, i.e., in a second direction of longitudinal extension $X_o$ of the B-pillar. Both the first and the second direction of longitudinal extension $X_u$, $X_o$, are to be understood to be vectors which point in opposite directions and extend parallel to one another. Below, reference will be made in a simplified way to the longitudinal direction X, if there is no need to emphasise the orientation downward or upward.

While neglecting the influence of the inner panel 7, the foot region 1 is determined entirely by the lower formed part 9 and head region entirely by the upper formed part 10. This means that material doubling occurs in the region of overlap 12 only, wherein the lower formed part 9 is made of sheet metal material and the upper formed part 10 is made of fibre-reinforced plastic. To that extent, the outer panel 8 is a hybrid component which is reinforced in the region of overlap 12.

The lower formed part 9 can be a hot-formed and hardened formed part. For producing the lower formed part 9, first a strip material, for instance a 22MnB5 sheet steel, is provided with an aluminium silicon coating and flexibly rolled. The flexibly rolled sheet steel is also referred to as Tailor Rolled Blank. Out of this coated strip material a blank is produced, so that the blank has a variable wall thickness along its longitudinal extension and, particularly, a constant wall thickness along the transverse extension. Prior to hot-forming of the blank, openings 13 for the functional parts, for instance receiving elements or attachment elements for a locking wedge for the front door, a door lock, a door hinge or a rear door catch, and further openings, are introduced into the blank. In principle, the openings 13 can also be introduced into the hot-formed and hardened lower formed part 9 by laser beam cutting. Subsequently, the blank is hot-formed, with hot-forming meaning forming a material above the re-crystallisation temperature of 22MnB5, used in this case. If required, local soft zones can be provided in the hardened lower formed part 9. Such soft zones can be provided, for instance, in the main failure region of the B-pillar, i.e., in the region designated for the absorption and release of crash energy. The soft zones, in respect of their material properties, are adapted to the respective requirements, for example to a particularly high fracture ductility value.

The upper formed part 10 is made of a fibre composite material with high-strength fibre materials, for instance carbon fibre reinforced plastic (CFK) or glass fibre composite material (GFK). The individual fibres of the fibre composite material can be arranged in as scrim, in which the fibres, ideally, are arranged in parallel and stretched, or as multi-axial scrim, in which the fibres are not exclusively arranged in a laminate layer, but in which additional fibres are orientated perpendicularly to the laminate layer, or as texture for specifically reinforcing individual regions of the upper formed part 10. "Texture" means that the individual fibres such as rovings are not stretched in one plane, but on any track, since often a complex fibre orientation is desired. The upper formed part 10 can have different wall thicknesses in longitudinal and/or transverse direction of the upper formed part 10.

Hereinafter, the structure of the B-pillar is described in detail. The inner panel 7 has an at least approximately planar and elongated basic shape into which there have been integrated several recesses 14 serving, for example, for feeding electric cables or other vehicle components. In an upper end region of the inner panel 7 there is provided the upper flange portion 6 for attaching the B-pillar to the roof plate.

On the side of the edge, there extend substantially two lateral flange-like supporting portions 16 in the longitudinal direction X of the B-pillar. The supporting portions 16, starting from the upper flange portion 6, extend along the central region 2 of the B-pillar into a lower end region 17 of the inner panel 7, and follow at least approximately the slightly curved shape of the B-pillar. Thereby, seen in transverse direction of the B-pillar, the inner portions of the supporting portions 16 serve to connect the inner panel 7 to the outer panel 8. Whereas outer flange portions 18 of the flange-like supporting portions 16 serve to attach further vehicle components to the B-pillar in the built-in condition, for example an outer skin 19 (shown in simplified form in FIG. 7). In the head region 3 of the B-pillar, the flange-like supporting portions 16 of the B-pillar comprise grooves 20 which at least substantially extend in the longitudinal direction X of the B-pillar and/or follow at least approximately the slightly curved course of the B-pillar. The grooves 20 serve to connect the inner panel 7 to the upper formed part 10 of the outer panel 8.

In the foot region 1 and in the central region 2 of the B-pillar, the inner panel 7 and the lower formed part 9 of the outer panel 8 are at least material-lockingly connected to one another. In FIGS. 1 and 2 it can be seen that the lower formed part 9 of the outer panel 8 is approximately T-shaped. The lower flange portion 4 for attaching the B-pillar to the base of the vehicle body is provided in a lower end region of the lower formed part 9.

Figures 3, 4:
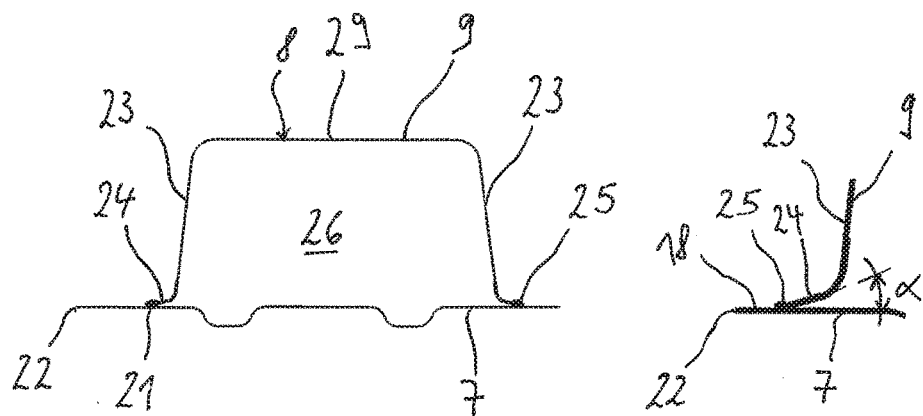
FIG. 3 shows the B-pillar in a schematic cross-sectional view along the section line III-III shown in FIG. 1.
FIG. 4 is an enlarged detail of the B-pillar shown in FIG. 3.

FIG. 3 shows a cross-section of the B-pillar along the section line III-III shown in FIG. 1. It can be seen that the lower formed part 9 has a U-shaped or hat-shaped cross-section above the lower flange portion 4. Thereby, connecting edges 21 of the lower formed part 9 are offset relative to the outer edges 22 of the inner panel 7, so that the inner panel 7 forms single-layered flange portions of the B-pillar in the outer flange portions 18 of the supporting portions 16. In detail, the hat-shaped lower formed part 9 is supported by its side walls 23 with two bent welding portions 24 on the inner panel 9, which two bent welding portions 24 can be produced by cutting the drawn-in flanges occurred during the process of hot-forming the blank for the lower formed part 9.

In the enlarged partial illustration in FIG. 4 it can be seen that, as a result of the inclined position of the two welding portions 24 towards the inner panel 7, the lower formed part 9 is in contact with the inner panel 7 only along the two connecting edges 21 extending substantially in the longitudinal direction X. The connecting edges 21 are set back relative to the outer edges 22 of the inner panel 7, as a result of which the flange portions 18 of the flange-like supporting portions 16 of the inner panel 7 are exposed, i.e., not covered by the outer panel 8. Therefore, along the outer flange portions 18 of the supporting portions 16 in the foot region 1 and in the central region 2 of the B-pillar, the B-pillar is of the single-layered design, as shown particularly in FIGS. 3 to 7. To be able to join the B-pillar to the further vehicle component, for instance to the outer skin 19, to the roof, or to glass surfaces, only the inner panel 7 has to be joined to the outer panel 8 of the further vehicle components or otherwise fixed along the single-layered flange portions 18. This can be done by welding or gluing, for instance.

The inner panel 7 and the lower formed part 9 are connected together along the two connecting edges 21 of the lower formed part 9 by means of a laser beam welding process by a continuous high energy weld 25, briefly the weld. The weld 25 can extend along the entire edge length of the respective connecting edge 21. Because of the inclined arrangement of the two welding portions 24 on the inner panel 7, between the lower formed part 9 and the inner panel 7 there is enclosed an angle α of, for example, 15°, so that there is formed an inner space 26 which opens into the interior of the B-pillar. The inner space 26 serves to de-gas the metal vapours released during the welding operation. At that point in time at which the upper formed part 9 has not yet been attached, the metal vapours can escape at the upper and lower end region of the lower formed part 9.

An advantage of the inner panel 7 and the lower formed part 9 overlapping only slightly because of the narrow welding portions 24 is that the different wall thicknesses of the lower formed part 9 do not have to correspond to the sheet thickness of the inner panel 7. As a result, the planning and production process for the B-pillar as well as the welding process are simplified. This means that the inner panel 7 can be a standardised closing plate across markets having a uniform plate thickness. Then only the lower formed part 9 has to be adapted to application- and market-specific specifications for crash protection conditions, in that certain partial regions of the lower formed part 9 are specifically reinforced or made softer by increasing or reducing the sheet thickness.

Figures 5, 6:
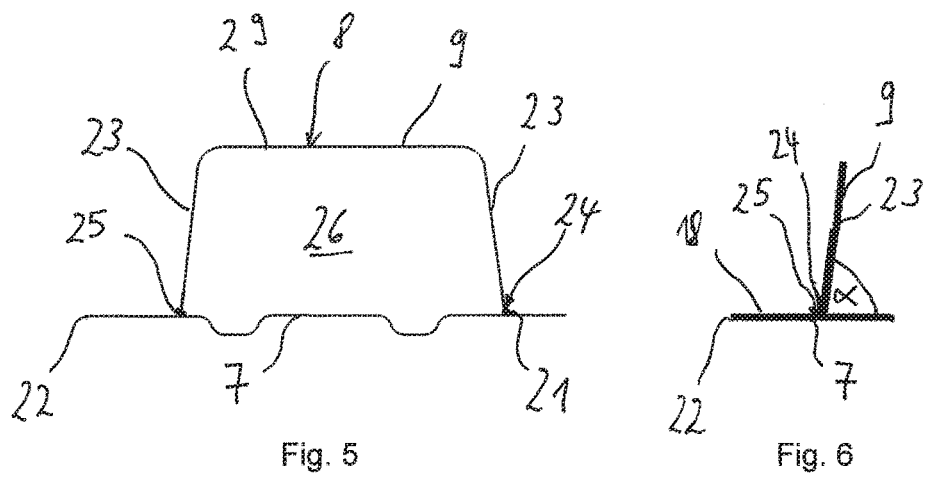
FIG. 5 shows the B-pillar in a schematic cross-sectional view along the section line III-III shown in FIG. 1, having an outer panel being an alternative to that shown in FIG. 3.
FIG. 6 is an enlarged detail of the B-pillar shown in FIG. 5.

FIG. 5 and FIG. 6, respectively, show an alternative cross-section of the B-pillar. In contrast to the example shown in FIGS. 3 and 4, the drawn-in flanges usually occurring during the process of hot-forming the lower formed part 9 have been completely cut off after press hardening. In this way, the lower formed part 9 receives a U-shaped cross-sectional basic shape, wherein the two welding portions 24 are formed at the outer edge regions of the side walls 23. FIG. 6 shows that the width of the welding portions 24 is limited to the width of the welds 25, so that the width of the welding portions 24 can range to less than 2 millimeters. Thus, the lower formed part 9, relative to the inner panel 7, when abutting, is joint at an angle α of approximately 80° and is joint to the inner skin 7 along the two connecting edges 21 by means of the laser beam welding process. Again, because of this inclined arrangement, the inner space 26 opening into the inside of the B-pillar serves to degas metal vapours released during the welding operation.

In the region of overlap 12, the upper formed part 10 is form-lockingly positioned from the outside on the lower formed part 9 and is material-lockingly and force-lockingly connected to the lower formed part 9, wherein, as described, the lower formed part 9 is at least material-lockingly connected to the inner panel 7.

Figure 7:
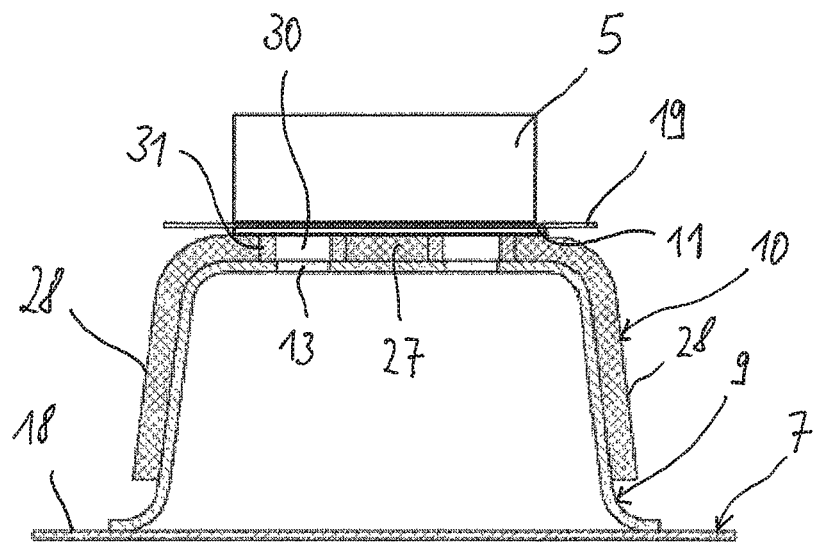
FIG. 7 shows the B-pillar in a schematic cross-sectional view along the section line VII-VII shown in FIG. 1.

The upper formed part 10 has an elongated basic shape with a U-shaped cross-section. In detail, the upper formed part 10 has an outer wall 27 and two side walls 28 which, as shown in FIG. 7, are arranged at a distance from the inner panel 7. The upper formed part 10, in the region of overlap, planar contacts the outside of the lower formed part 9. Between the upper formed part 10 and the lower formed part 9, a blocking layer (not shown) can be arranged to avoid contact corrosion.

As can be seen in FIG. 2, the longitudinal extension of the region of overlap 12 is approximately 50% to 60% of the longitudinal extension of the upper formed part 10 and approximately 35% to 45% of the longitudinal extension of the upper formed part 10. As for protecting the passengers, a vehicle body is usually designed to be stiff, especially in the central region 2 of the B-pillar, the region of overlap 2 of the B-pillar can advisably be formed in the central region 2 of the B-pillar. In principle, it is possible and conceivable that, depending on the requirements to be met by the vehicle body, the region of overlap 12 can be formed in the foot or head region 1, 3 of the B-pillar and/or extends over several regions 1, 2, 3.

Besides the described form-lock, the lower formed part 9 and the upper formed part 10 are also material- and force-lockingly connected to one another. For producing a material-locking connection, the two formed parts 9, 10 are glued to one another in the region of overlap 12. FIG. 7 shows that the lower formed part 9 and the upper formed part 10 are force-lockingly connected in the region of overlap 12 by fixing elements (not shown), for instance by screws or rivets. The fixing elements are configured for attaching functional parts 5 such as receiving elements or attaching elements for a locking wedge for the front door, a door lock, a door hinge or a rear door catch.

For receiving the fixing elements, the upper formed part 10 and the lower formed part 9 have covering openings 30, 13 in their outer walls 27, 29 being superimposed on one another. Furthermore, sleeves 31 are inserted into the openings 30 of the upper formed part 10 in order to avoid contact corrosion between the fixing elements and the upper formed part 10. The sleeves 31 can be varnished, for example, or made of titanium or another corrosion-resistant material. Furthermore, in the region of overlap 12, on the outer face of the upper formed part 10 facing away from the inner panel 7, there can be arranged the reinforcing element 11 made of sheet metal for supporting the fixing elements. In this way, when a crash energy is introduced, for instance in the case of a side impact, the fixing elements are prevented from being pressurised through the outer panel 8 and the upper formed part 10 made of fibre-reinforced plastic, virtually punching out the upper formed part 10. The reinforcing element 11 can be provided as a sheet metal piece, which can also be referred to as patch. For this purpose, the reinforcing element 11 can be produced from sheet metal, particularly from a steel plate. Between the reinforcing element 11 and the upper formed part 10, there can also be provided a blocking layer (not shown) for avoiding contact corrosion. In addition, in the region of overlap, the lower formed part 9 and the upper formed part 10 can comprise through-openings 32, 33 in the side walls 23, 28 for receiving further fixing elements which are also able to connect the two formed parts 9, 10 in a force-locking way.

Figure 8:
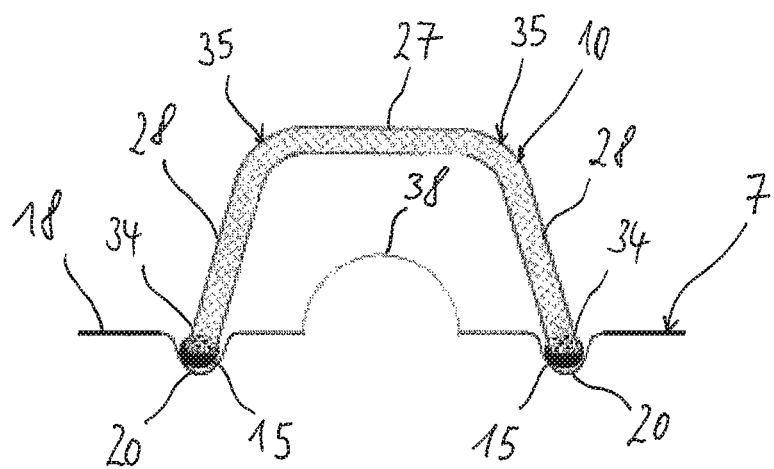
FIG. 8 shows the B-pillar in a schematic cross-sectional view along the section line VIII-VIII shown in FIG. 1.

FIG. 8 shows a cross-section of the B-pillar along the section line XIII-XIII shown in FIG. 1, located in the head region 3 of the B-pillar. It can be seen that, above the region of overlap 12, the upper formed part 10 is directly form-lockingly connected to the inner panel 7. In the upper flange portion 6, the upper formed part 10 can be fixed to the inner panel 7, for example by riveted connections (not shown in greater detail) and at the central region 2 for example by riveted connections by means of which the functional parts 5 are fixed to the B-pillar, as well by the connection to the lower formed part 7. At the edge regions of the side walls 28 of the upper formed part 10, there are formed connecting portions 34 which form-lockingly engaged into the grooves 20 of the inner panel 7. For producing the material-locking connection, the connecting portions 34 in the grooves 20 can be glued to the inner panel 7 by adhesive beads 15. In this way, the upper formed part 10 is fixed to the inner panel 7 in the head region 3 of the B-pillar.

Figure 9:
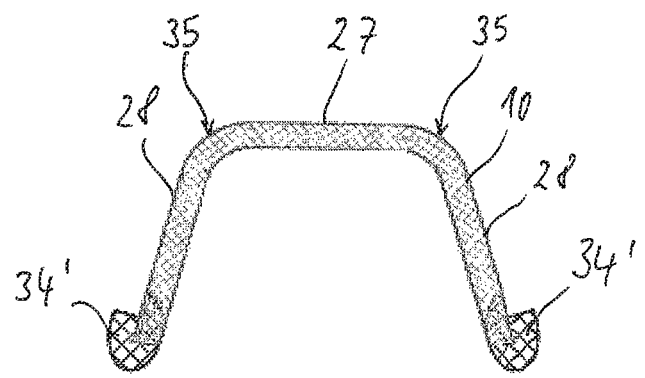
FIG. 9 shows the outer panel in a schematic cross-sectional view along the section line VIII-VIII shown in FIG. 1, having an outer panel being an alternative to that shown in FIG. 8.

FIG. 9 shows that the connecting portions 34' of the upper formed part 10 can also be provided as bent edge regions of the upper formed part 10. By means of the bent or bent-over edge regions forming the connecting portions 34' of the upper formed part 10 the edge regions of the upper formed part 10, which are subjected to tensile stress, are reinforced and the notch sensitivity is reduced.

Figure 10:
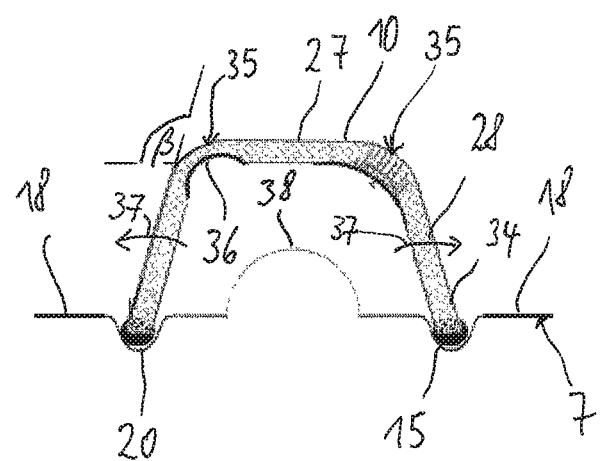
FIG. 10 shows the B-pillar in a schematic cross-sectional view along the section line VIII-VIII shown in FIG. 1, having an outer panel being a further alternative to that shown in FIG. 8.

Furthermore, it can be seen in FIGS. 8 and 10 that between the side walls 28 and the outer wall 27 of the upper formed part 10 there is enclosed an angle β of approximately 110°. In this way, in the case of a force acting from the outside on the outer panel 8, particularly if a crash energy resulting from a crash impact is introduced, the outer wall 27 of the upper formed part 10 can elastically resilient up to 10% of the construction-related distance between the outer wall 27 and the inner panel 7 towards the inner panel 7. As a result, the B-pillar in the head region 3 is configured spring-like and, in the resilient region, has a deformable basic shape.

In order to improve the springiness of the upper formed part 10 if a crash energy is introduced, i.e., so that the upper formed 10 can absorb more energy, it can be seen in FIG. 8 that the inner panel 7 comprises a materially weakened portion 38 being arranged between the side walls 38 of the upper formed part 10. The weakened portion 38 extends above the region of overlap 12 in the second direction of longitudinal extension $X_o$ of the B-pillar. This means that in the case of a side impact the side walls 28 of the at least partially U-shaped upper formed part 10, which side walls 28 engage the grooves 20 of the inner panel 7, erect relative to the inner panel 7, i.e., the distance between the free longitudinal ends of the side walls 28 is reduced. If the introduced crash energy remains below the fracture force of the upper formed part 10, the side walls 28 of the upper formed part 10 can move outwardly again after the load has been removed, i.e., the distance between the free longitudinal ends of the side walls is increased again. As a result, the upper formed part 10 is able to "breath" without breaking. Then, along the weakened portion 38, the inner panel 7 is drawn apart again by the outwardly moving free longitudinal ends which engage the grooves 20 of the inner panel 7, and the upper formed part 10 releases the energy received.

Furthermore, FIGS. 8 and 10 show that the outer flange regions 18 of the inner panel 7, analogous to the foot range 1 and the central region 2 of the B-pillar, are single-layered to make it possible for joining the further vehicle components, for example the outer skin 19, glass surfaces, or the roof in a simple way.

FIG. 10 shows a further example of the B-pillar with reference to a cross-section through the B-pillar along the section line XIII-XIII shown in FIG. 1. It can also be seen that, for the purpose of influencing the crash behaviour of the B-pillar in the head region 3, the upper formed part 10, in the regions of transition 35 between the outer wall 27 and the side walls 28 comprises a joint-like material weakening in the form of a notch 36 which, for the purpose of clarifying the differences, is shown only in the transition region which, in a view of FIG. 10, is positioned on the left. By specifically weakening the upper formed part 10 in both transition regions 35, it is possible to adjust the spring behaviour of the B-pillar if the B-pillar is acted upon a force coming from the outside. Thus, in the case of a side impact, the outer wall 27 of the upper formed part 10 can be pushed towards the inner panel 7, with the side walls 28 being able to give in that they stand up in the direction of the arrows 37 relative to the inner panel 7.

Material weakening, here in the case of the notch 36, as shown in FIG. 10, can be combined with the straight connecting portions 34 according to FIG. 8 and with the bent connecting portions 34' as shown in FIG. 9.

Further shown in FIG. 10 is proposed a portion whose material has been weakened, which is arranged between the side walls 28 of the upper formed part 10 and which extends above the region of overlap 12 in the second direction of longitudinal extension $X_o$ of the B-pillar.

For producing the B-pillar, it is possible first to connect the lower formed part 9 to the inner panel 7, particularly by a high-energy beam welding process which, as compared to other welding processes, introduces the thermal energy in a smaller amount and in a more concentrated form into the components to be joined. Because the connecting edge 21 of the lower formed part 9 is offset relative to the outer edge 22 of the inner panel 7, the connecting edge 21 can easily be reached from one side, as a result of which the application of the high-energy beam welding process is simplified. As a high-energy beam welding process, besides the electric arc and electron beam welding process, the laser beam welding process is particularly suitable, wherein the selected welding process can be carried out with or without any additional material. The high-energy beam weld 25 is produced along at least 50% of the edge length of the connecting edge 21, and it is possible to produce a continuous or interrupted weld.

After the lower formed part 9 has been connected to the inner panel 7, the upper formed part 10 is placed onto the lower formed part 9 and the inner panel 7 such that, on the one hand, the lower formed part 9 and the upper formed part 10 overlap one another only along a region of overlap 12 and that, on the other hand, the upper formed part 10 is supported in the head region 3 on the inner panel 7. Furthermore, the upper formed part 10 is glued to the lower formed part 9 in a planar way and to the inner panel 7 in the grooves 20.

Subsequently, the B-pillar can be fixed to the vehicle body, wherein the lower flange portion 4 is attached at the base of the vehicle body and the upper flange portion 6 is attached at the roof region of vehicle body, particularly by a welding process. In principle, it is possible for the upper formed part 10 to be placed on the lower formed part 9 only now and connected to same.

As soon as the functional parts 5 have been attached to the B-pillar, also the upper formed part 9 and the lower formed part 10, are force-lockingly connected to one another by fixing elements which engage the openings 30, 23.

The invention claimed is:

1. A B-pillar for a motor vehicle body, comprising
an inner panel made of sheet metal material and a multi-component outer panel that is connected to the inner panel,
wherein the outer panel comprises a lower formed part made of sheet metal material and an upper formed part made of fiber-reinforced plastic,
wherein the lower formed part and the upper formed part are arranged along a region of overlap so as to overlap one another, and are connected to one another such that the lower formed part projects from the upper formed part beyond the region of overlap in a first direction of longitudinal extension of the B-pillar and the upper formed part projects from the lower formed part beyond the region of overlap in a second direction of longitudinal extension of the B-pillar,
wherein the lower formed part comprises at least one welded portion for being connected to the inner panel, wherein the lower formed part and the inner panel are connected to one another by welding, and wherein an outer edge of the lower formed part is spaced from an outer edge of the inner panel such that the inner panel forms a single-layered flange portion of the B-pillar between the outer edge of the lower formed part and the outer edge of the inner panel.

2. The B-pillar according to claim 1, wherein a longitudinal extension of the region of overlap is smaller than at least one of 70% of a longitudinal extension of the lower formed part and 50% of a longitudinal extension of the upper formed part.

3. The B-pillar according to claim 1, wherein, in the region of overlap, the lower formed part and the upper formed part are material-lockingly and force-lockingly connected to one another.

4. The B-pillar according to claim 1, wherein, in the region of overlap, the lower formed part and the upper formed part are force-lockingly connected to one another by fixing elements, wherein the fixing elements are configured for attaching functional parts held at the B-pillar.

5. The B-pillar according to claim 4, wherein a reinforcing element made of sheet metal material is provided for supporting at least one of the fixing elements, said reinforcing element arranged in the region of overlap on an outer face of the upper formed part facing away from the inner panel.

6. The B-pillar according to claim 1, wherein the inner panel comprises supporting portions extending at least approximately in the second direction of longitudinal extension and the upper formed part comprises corresponding connecting portions connectable to the supporting portions, wherein the inner panel and the upper formed part are form-lockingly connected to one another outside the region of overlap.

7. The B-pillar according to claim 6, wherein, outside the region of overlap, the supporting portions comprise grooves in which the connecting portions of the upper formed part are fixed in at least one of a form-locking and material-locking manner.

8. The B-pillar according to claim 6, wherein the connecting portions of the upper formed part are provided as bent edge regions of the upper formed part.

9. The B-pillar according to claim 1, wherein, outside the region of overlap, at least partially, the upper formed part has a U-shaped cross-section, and the upper formed part is configured such that an outer wall of the upper formed part resiliently suspends up to 10% of a construction-related distance between the outer wall and the inner panel towards the inner panel, when a force acts from the outside onto the outer panel.

10. The B-pillar according to claim 9, wherein the connecting portions of the at least partially U-shaped upper formed part are formed at edge regions of two side walls of the upper formed part, wherein between the outer wall and the respective side walls, there is enclosed an angle ranging between 100° and 170°.

11. The B-pillar according to claim 10, wherein, in transition regions between the outer wall and the side walls, the upper formed part comprises at least one of a joint-like material weakening, a notch and a buckled area.

12. The B-pillar according to claim 10, wherein the inner panel comprises a material weakened portion which is arranged between the side walls of the upper formed part and extends above the region of overlap in the second direction of longitudinal extension of the B-pillar.

13. A B-pillar for a motor vehicle body, comprising:
an inner panel made of sheet metal material and a multi-component outer panel that is connected to the inner panel,
wherein the outer panel comprises a lower formed part made of sheet metal material and an upper formed part made of fiber-reinforced plastic,
wherein the lower formed part and the upper formed part are arranged along a region of overlap so as to overlap one another, and are connected to one another such that the lower formed part projects from the upper formed part beyond the region of overlap in a first direction of longitudinal extension of the B-pillar and the upper formed part projects from the lower formed part beyond the region of overlap in a second direction of longitudinal extension of the B-pillar,
wherein, outside the region of overlap, at least partially, the upper formed part has a U-shaped cross-section, and the upper formed part is configured such that an outer wall of the upper formed part resiliently suspends up to 10% of a construction-related distance between the outer wall and the inner panel towards the inner panel, when a force acts from the outside onto the outer panel.

14. A B-pillar for a motor vehicle body, comprising:
an inner panel made of sheet metal material and a multi-component outer panel that is connected to the inner panel,
wherein the outer panel comprises a lower formed part made of sheet metal material and an upper formed part made of fiber-reinforced plastic,
wherein the lower formed part and the upper formed part are arranged along a region of overlap so as to overlap one another, and are connected to one another such that the lower formed part projects from the upper formed part beyond the region of overlap in a first direction of longitudinal extension of the B-pillar and the upper formed part projects from the lower formed part beyond the region of overlap in a second direction of longitudinal extension of the B-pillar,
wherein the inner panel comprises supporting portions extending at least approximately in the second direction of longitudinal extension and the upper formed part comprises corresponding connecting portions connectable to the supporting portions, wherein the inner panel and the upper formed part are form-lockingly connected to one another outside the region of overlap, and
wherein, outside the region of overlap, at least one of the following applies: (1) the supporting portions comprise grooves in which the connecting portions of the upper formed part are fixed in at least one of a form-locking and material-locking manner, and (2) the connecting portions of the upper formed part are provided as bent edge regions of the upper formed part.

* * * * *